Dec. 6, 1949 H. F. OLSON ET AL 2,490,466
LOUDSPEAKER DIAPHRAGM SUPPORT COMPRISING
PLURAL COMPLIANT MEMBERS
Filed July 19, 1944 3 Sheets-Sheet 1
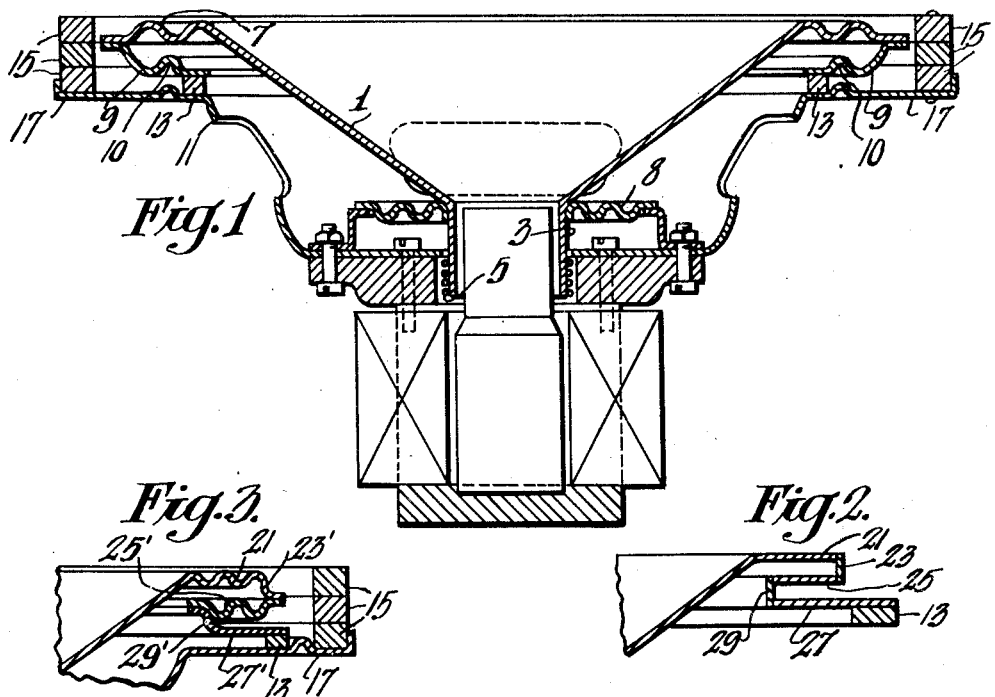
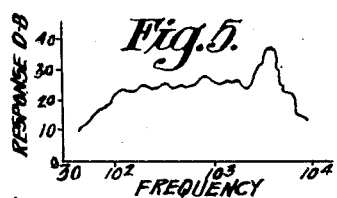
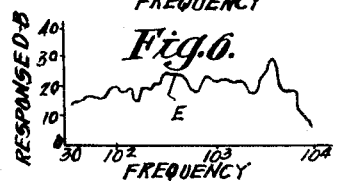
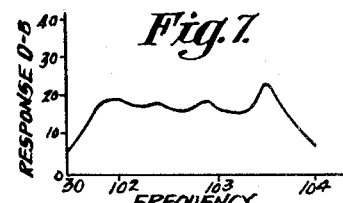
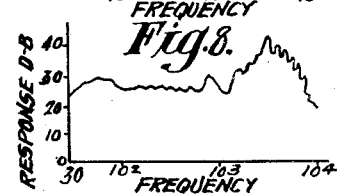
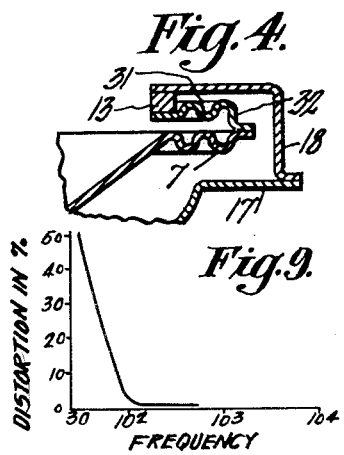
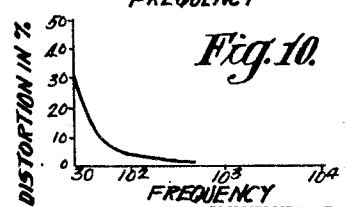
INVENTORS
Harry F. Olson
& John Preston
BY
ATTORNEY

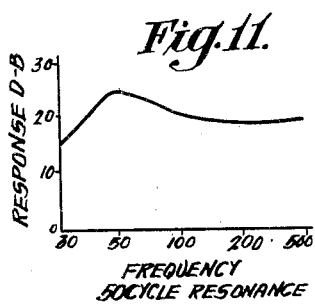
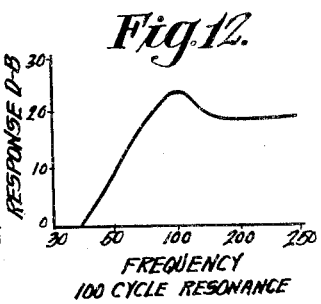
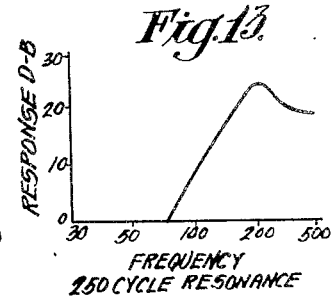
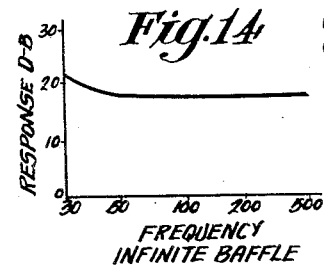
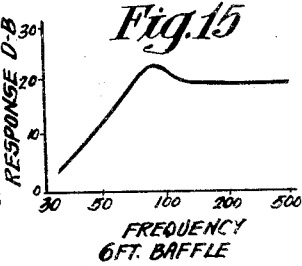
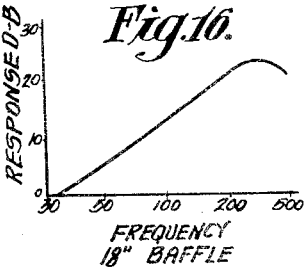
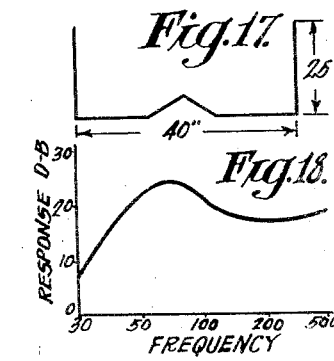
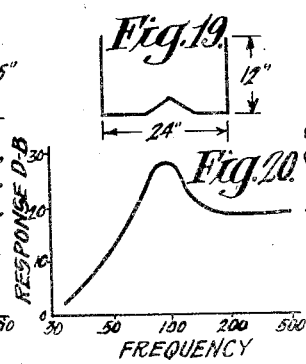
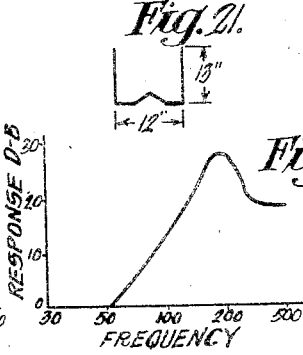
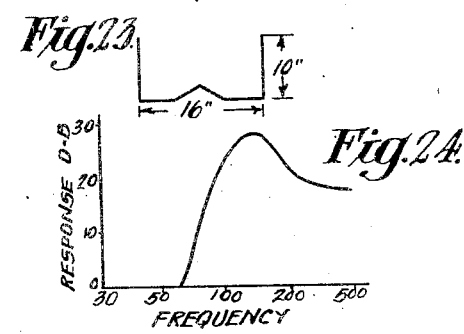
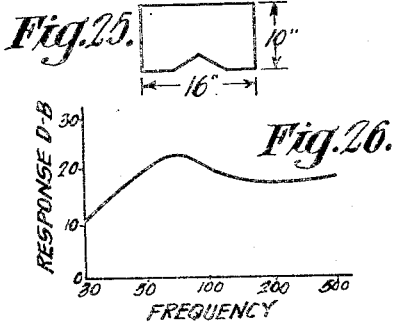

Dec. 6, 1949     H. F. OLSON ET AL     2,490,466
LOUDSPEAKER DIAPHRAGM SUPPORT COMPRISING
PLURAL COMPLIANT MEMBERS
Filed July 19, 1944     3 Sheets-Sheet 3

INVENTORS
*Harry F. Olson*
BY *& John Preston*

*C. D. Tuska*
ATTORNEY

WITNESS
*F. J. Harbaugh*

Patented Dec. 6, 1949

2,490,466

UNITED STATES PATENT OFFICE 2,490,466

LOUDSPEAKER DIAPHRAGM SUPPORT COMPRISING PLURAL COMPLIANT MEMBERS

Harry F. Olson, Princeton, and John Preston, Hopewell, N. J., assignors to Radio Corporation of America, a corporation of Delaware Application July 19, 1944, Serial No. 545,672

11 Claims. (Cl. 181—31)

This invention relates to sound producing devices, and more particularly to loudspeaker diaphragm supports and housings, for use in radio receivers, phonographs, announce systems, and the like.

An object of the invention is to increase the power handling capacity of a small speaker, making it comparable to one substantially larger in size in its output of undistorted acoustic energy and fidelity of reproduction of desired low as well as high frequency sound waves.

Another and more specific object of the invention is to provide an improved diaphragm suspension structure in a loudspeaker characterized by a reduction in the effect of the suspension impedance, thus lowering the natural resonant frequency of the speaker of a given size, without increasing the mass reactance of the moving parts.

A further object of the invention is to provide an improved compliant suspension in a limited space for a piston-type loudspeaker diaphragm of small mass reactance whereby the diaphragm is free to vibrate at large amplitude over a substantially extended portion of the lower audio frequency range without amplitude distortion.

A still further object of the invention is to improve the low frequency response of loudspeakers mounted in small housings as in small radio receivers.

In accordance with the invention, an acoustical system has been devised that extends the low frequency range of small speaker-housing combinations, such as table model radio receivers, as much as one octave. The quality of musical reproduction has been substantially improved. The intelligibility and quality of speech has been increased as a result of elimination of cabinet resonance. The non-linear distortion has been reduced to as much as one-tenth in certain portions of the range. The invention comprises essentially a completely enclosed housing for the rear surface of a cone type loudspeaker having a novel base suspension of substantially lowered stiffness, the arrangement being simple and inexpensive.

Still further in accordance with the invention, there is provided an improved dual flexible support for the base of a frusto-conical or piston type of diaphragm adapted to move as a whole at low audio frequencies and characterized by the fact that greatly increased axial flexibility is obtained with no greater than normal diametrical space requirements. The increased flexibility and efficiency is obtained in certain forms of the invention by arranging in tandem compliant radial sections located in planes, respectively, substantially normal to the axis of the diaphragm. These, as well as other features of the invention, will become apparent from the following description with reference to the drawings, in which:

Figure 1 is a side elevation view, in section, of a dynamic type loudspeaker including a diaphragm suspension embodying the invention, Figures 2, 3 and 4 are fragmentary side elevation views, in section, of modified forms of the invention, Figure 5 to 10, inclusive, are characteristic curves of performance of various forms of loudspeakers, mostly embodying the invention, Figures 11 to 16, inclusive, are characteristic curves illustrating principles underlying the invention, Figures 17, 19, 21, 23 and 25, inclusive, illustrate various sizes and shapes of speaker housings, in plan view, together with corresponding characteristic curves (Figs. 18, 20, 22, 24, 26) illustrating principles underlying the invention, Figure 27 shows a schematic side elevation view of a standard type speaker diaphragm and flexible base support, Figure 28 shows characteristic curves of the speaker illustrated in Figure 27, and Figure 29 shows a characteristic performance curve A of a speaker and cabinet constructed in accordance with the invention, as in Fig. 25, in comparison with a characteristic curve B of a speaker and housing not including the present invention, as in Fig. 23, these curves being similar, respectively, to the curves in Figs. 26 and 24.

Heretofore the usual type of flexible suspension for the base of a frusto-conical acoustic diaphragm has consisted in an annularly corrugated fibrous support rim attached to the base of the diaphragm, or molded integrally therewith, as in Hawley 2,006,830. The purpose of such a suspension has been to provide lateral stiffness to sidewise movement of the diaphragm while allowing freedom of movement in an axial direction, the direction in which the diaphragm is normally driven. The difficulty, particularly with small size speakers, is that there has been too great stiffness in the axial direction, with the result that the range of low frequency response has been limited. Attempts have been made to increase flexibility by increasing the radial dimension of the suspension, but this has resulted in unduly large diaphragm housings in the diametrical direction, or has resulted in decreasing the size of a speaker diaphragm for a given size housing. Since the low frequency resonance, below which response falls off rapidly, of a speaker is a function of the mass reactance of the moving structure and the stiffness impedance or compliance, it is essential that the stiffness of the flexible support be reduced to a minimum in order to lower the resonant frequency, and hence materially extend the low frequency end of the audible range of reproduction. Increasing the mass in order to lower the range is objectionable because it reduces the effectiveness for the reproduction of higher audio frequencies.

In accordance with the invention, the desired results have been accomplished by providing flexible support means comprising a plurality of compliant sections connected in series relation and disposed in parallel planes in superposed or overlapping relation, thereby getting at least as good compliance effect as with a single flexible support of much larger radial extent. This makes possible the use of a larger diaphragm with a given size of housing frame and desired amount of compliance in the flexible support. Alternatively, it makes possible the reduction in overall size of a speaker housing frame in the diametrical dimension for a given size diaphragm.

The sound power output of a mass-controlled dynamically-driven diaphragm operating below the frequency of ultimate resistance is independent of the frequency. In this range the velocity of the cone is inversely proportional to the frequency. Below the fundamental resonance frequency of the cone and suspension the system is stiffness-controlled and the velocity is proportional to the frequency. Since the radiation resistance is proportional to the square of the frequency, the response falls off very rapidly below the fundamental resonance frequency of the loudspeaker. Suspension systems in use today are non-linear. Since the loudspeaker is stiffness-controlled below the fundamental resonance frequency, the use of a non-linear suspension results in harmonic production. One solution of the problem of improving the low frequency response and reducing the non-linear distortion is to decrease the stiffness of the suspension system. When the stiffness of the suspension is reduced by increasing the size, difficulty is experienced in the mid-frequency range. This type of suspension breaks into various modes of vibration in the mid-range which produces a non-uniform response characteristic.

Referring to Fig. 1, an electro-dynamic speaker is shown as comprising a diaphragm 1 having a stiffened central portion, preferably frustroconical and a fibrous seamless felted construction. It is provided at its small end with a voice coil form 3, cemented thereto and carrying a voice coil 5. The base of the diaphragm terminates in a compliant peripheral fibrous ring member or support rim 7, preferably circumferentially corrugated, and extending radially outward from the base. The outer peripheral edge of ring member 7 is flexibly supported by a fibrous, compliant ring member 9, members 7 and 9 being joined or cemented together at their outer edges, member 9 extending radially inward from this joint in spaced overlapping relation with respect to rim 7. The members 7 and 9 also function as an acoustic seal for the baffle in which the speaker is mounted. The member 9 is curved in cross-section as shown at point 9, resembling a relatively large corrugation, and is also circumferentially corrugated as shown at point 10 to further increase the flexibility. The effect of the corrugations is to give the auxiliary member 9 a high degree of compliance in the axial direction of diaphragm movement. This auxiliary member is supported and attached at its inner edge to a rigid metallic diaphragm support housing 11 by means of an intermediate fibrous ring 13, which is cemented to the housing and to the member 9. The member 9 is preferably made by the felting process.

The flexible suspension system for the diaphragm base is protected circumferentially as well as axially by means of a stack of annular fibre members 15, attached to a flange portion 17 of the diaphragm housing and extending forwardly of the plane of the diaphragm base. This additional compliant member 9 greatly reduces the stiffness of the diaphragm base suspension for axial or longitudinal movement of the diaphragm, and because of its re-entrant disposition does not increase the overall diametrical size of the speaker. This auxiliary compliant member is so designed as not to substantially decrease the lateral stiffness of the suspension system. The small end of the diaphragm is flexibly supported by an outwardly extending corrugated disk 8, as disclosed in Patent 1,893,049 to Bodette. There is adequate room for an extended support for the small end of the diaphragm, resulting in adequate flexibility, but the limiting factor in suspensions has been in the base support for the diaphragm. The speaker shown is basically a standard type known as the RL—76—2, modified in accordance with the invention, by the addition of the auxiliary compliant member 9.

Referring to Fig. 2, a triple-folded suspension is shown without the usual compliant corrugations. In this arrangement, the base of the diaphragm was extended radially into a flexible fibrous flange 21, the periphery of which had cemented to it a fibrous coupling ring 23 extending circumferentially around the outer edge of the member 21. A second fibrous flexible annular member 25 was cemented to the lower edge of coupling element 23; and a third compliant fibrous member 27 was coupled at its inner edge, by means of an annular fibrous element 29 (as in the case of element 23) to the corresponding peripheral edge of element 25. The fundamental resonance frequency of this construction was found to be as low as 25 cycles, as compared with a resonance frequency between 110 to 150 cycles for the conventional molded paper base suspension, and 60 or 70 cycles for a diaphragm of similar nature supported by leather or imitation leather. This low resonance is somewhat lower than necessary for most purposes, but it illustrates the improvements in low frequency response made possible by the present invention. The elements 23 and 29, by reason of their shape, are relatively stiff and serve as light-weight spacing elements coupling the compliant members 21, 25 and 27.

Referring to Figure 3, a more practical embodiment of the triple suspension of Figure 2 is shown. In this arrangement, the integral annular flange 21 on the base of the diaphragm is corrugated circumferentially as usual and is provided at its outer portion with a downwardly extending edge 23', similar in function to coupling element 23 in Fig. 2, for the purpose of attachment to a second compliant member 25' and for spacing the two members as shown. A third suspension member 27' is provided at its inner circumferential edge with an upwardly extending spacing portion 29' for attachment to the inner edge of compliant member 25' and for spacing the second and third compliant members. The outer edge of the third compliant member 27' is supported on the flange 17 of the diaphragm housing, as by means of a fibrous ring 13 as in Fig. 1. The suspension structure 27' is flexible for the force exerted by the driving mechanism and functions effectively as a third compliant member in series with the peripheral member 21 and ring member 25'.

Referring to Fig. 4, the arrangement is somewhat similar to Figs. 1 and 3, except that the compliant member 31 is mounted forwardly of the flexible rim 7 on the base of the diaphragm. Element 31 is provided with a downwardly extending coupling portion 32 for attachment to the flexible portion 7 at its outer periphery and for spacing the flexible portions from each other. The flange 17 of the diaphragm housing is provided with a forwardly and inwardly extending member 18 for supporting the suspension member 31 through element 13, and for protecting the suspension system. This is a novel adaptation of the structure shown in Seabert Patent 2,329,-560, September 14, 1943 to the present invention.

Fig. 5 shows the response frequency characteristic on a standard type loudspeaker, designated as PL-52 for future reference, mounted in a three-foot irregular baffle, with a microphone distance of two feet, for acoustic measurements.

A response frequency characteristic on a speaker having a cone and flexible suspension, shown in Fig. 2 and taken under the same conditions as in the case of Fig. 5, is shown in Fig. 6. The low frequency range has been extended more than an octave, relative to Fig. 5. It will also be seen that the response between 250 and 550 cycles, point E on the curve, is higher than that of the standard PL-52 speaker. This is due to a resonance in the suspension system. The flat type of folded suspension shown in Fig. 2 exhibits resonances in the mid-range which are undesirable.

The response frequency characteristic of a standard loudspeaker of the type referred to as RL-76-2 in Fig. 1, mounted in a three-foot irregular baffle and a microphone distance of two feet, is shown in Fig. 7.

A response frequency characteristic on the cone and suspension system shown in Fig. 1, and taken under the same conditions as above with the standard RL-76-2 speaker, is shown in Fig. 8. The low frequency range has been extended an octave. In this case, the range above 100 cycles has not been changed by the substitution of the new suspension system. The use of a molded or felted suspension system with curved edge portions at 9 in Fig. 1 eliminates spurious responses at the higher audio frequencies, as shown.

Referring to Fig. 9, the distortion characteristic of a standard loudspeaker, type RL-76-2, with 5 watts input is illustrated. This characteristic was obtained by means of a velocity microphone and a standard distortion meter. The distortion of the signal feeding the loudspeaker was reduced by means of filters suppressing all frequencies except the fundamental. It is important in acoustic distortion measurements on loudspeakers to reduce the harmonic content in both the actuating signal and measuring equipment to insure reliable data. In addition, if the measurements are made in a room, the reflected sound striking the microphone must be a small fraction of the direct sound.

As shown in this figure, above the fundamental resonance frequency of the cone the distortion is low. Above 100 cycles the distortion is less than 2 per cent. Below 80 cycles the distortion increases rapidly with decrease in frequency, because the motion of the vibrating system is controlled by the suspension system. The distortion is caused by the non-linear characteristics of the suspension system. Considerable work has been performed on suspension systems with the object of developing one with linear characteristics. This problem, however, is not easily solved.

Since a linear suspension is not available, the distortion may be reduced by reducing the effect of the suspension impedance. Above the resonance frequency, the distortion is low because the suspension reactance is small compared to the mass reactance. Therefore, the distortion can be lowered by reducing the fundamental resonance frequency. By means of the folded suspension shown in Fig. 1, the resonance frequency is reduced from 80 to 32 cycles, that is, by the addition of the re-entrant compliant member 9 to the suspension of a standard loudspeaker. The distortion characteristic of such a speaker as the RL-76-2, modified in accordance with the present invention, as shown in Fig. 1, is illustrated in Fig. 10. The measurements were made under the same conditions as described above in the case of Fig. 9. Comparing this characteristic with Fig. 9, it will be seen that the distortion has been reduced to about one-third in the region below 80 cycles. The curves shown are too small to be very useful, but the actual curve data taken show a distortion at 50 cycles of 29 per cent for Fig. 9 and 9 per cent for Fig. 10, by way of example; at 80 cycles it was 7½ per cent (Fig. 9) and 3 per cent (Fig. 10). The larger portion of the distortion shown in Fig. 10 is not due to the suspension, but to a "voice coil turn-flux density" product which varies with the position of the voice coil in the air gap (Fig. 1), in which coil 5 moves longitudinally. Employing an air gap system which partially reduces the variation in this product, the distortion was found to be less than 5 per cent at 50 cycles and 5 watts input, and less than 2 per cent at 80 cycles, same input.

During the past few years, the trend has been in the direction of smaller and smaller radio cabinets, together with smaller and smaller loudspeakers. With the small loudspeaker and cabinet has come reduction in low frequency response.

It is well known that an infinite or very large baffle is the best system for maximum low frequency output from a direct radiator cone loudspeaker. The response characteristic of a direct-acting cone loudspeaker mounted in an infinite baffle for various cone diaphragm resonances is illustrated in Figs. 11 to 13, the characteristic curve data and explanatory notes in the drawing being self-explanatory. The characteristics illustrated show that an infinite baffle is not the only requirement for obtaining proper low frequency reproduction. For example, with a cone resonance of 250 cycles, the response is down about 15 d. b. at 100 cycles, and down 27 d. b. at 50 cycles. Another requirement is that a direct radiating diaphragm have a resonance at a frequency sufficiently low to realize the ultimate possibilities of the system.

Referring to Figs. 14 to 16, consideration is given to the action of a direct radiating diaphragm having a very low resonance, of the order of 30 cycles per second, mounted in various sizes of flat baffle. It will be seen that the low response with the small baffle is caused by circulation of sound waves from the front to the back of the diaphragm at low frequencies around the edge of the baffle. In other words, the air at the low frequencies is merely pumped from one side of the cone diaphragm to the other without useful radiation of the low frequency sound waves involved.

A cabinet is quite similar to a baffle in the manner in which the response falls off at the low frequency sound waves, but differs in the fact that another factor is introduced—namely, cabinet resonance. The response of various size cabinets employing a cone resonant at 30 cycles is shown in Figs. 17 to 22. Fig. 18, for example, is the response characteristic of a speaker cabinet combination shown in Fig. 17, the cabinet being 40 inches wide by 40 inches high and 25 inches deep. Fig. 20 is the response characteristic of a cabinet 24 inches square by 12 inches deep, and Fig. 22 is the response characteristic of a cabinet 12 inches square by 13 inches deep. These illustrations show that it is ordinarily necessary to have a large cabinet to obtain adequate low frequency response, even though a loudspeaker having a cone with low resonance characteristic is employed.

The resonance characteristic of the two smaller cabinets shown in Figs. 19 and 21 (representative, respectively, of a small console and a large table model) occurs in the fundamental frequency range of speech and results in a boomy and unintelligible action for speech. Furthermore, the fundamentals in music are not reproduced.

The foregoing examples have assumed a cone with a very low resonance. Referring to Figs. 23 and 24, a typical table model speaker and cabinet is shown with the usual resonance response of the diaphragm. The curve of Fig. 24 shows the response of a cabinet 16 inches square by 10 inches deep, employing an ordinary speaker as described. Both the cone resonance and cabinet resonance fall in the fundamental frequency range of speech. Below the resonant frequency, the response falls off 18 d. b. per octave, with the result that music is lacking in low frequency response. In such arrangements, it has been customary to attempt to boost the low frequency response in the amplifier supplying energy to the speaker, but even this expedient cannot overcome the rapid decrease in response at the low frequency end of the range.

From the above discussions, it appears that a large baffle or a very large cabinet with a low frequency cone diaphragm resonance is the solution. According to the present invention, we have found that substantially the same results can be obtained with a small cabinet if it is completely enclosed, as shown in Fig. 25, which shows a cabinet of the same dimensions as Fig. 23 but with the back enclosed. In this case, a diaphragm resonance of 40 cycles is employed. The diaphragm is mounted in an opening in a wall of a substantially closed cabinet or housing for confining the atmosphere around the rear surface of the diaphragm, the natural resonance of the sound-reproducing device in unconfined air being substantially below the natural resonance of the device in the cabinet.

Fig. 26 shows the resultant response characteristic. The fundamental resonance of the cabinet and cone in combination is 80 cycles, as shown. The confined air in back of the diaphragm adds stiffness to the suspension system. Therefore, it is desirable to use a speaker with a resonance lower than normal so that, with the added stiffness, the resultant resonance will still be desirably low, e. g., 80 cycles as in this case. The fundamental frequency range of speech is not accentuated. Furthermore, the fundamentals in music are reproduced properly by this arrangement, and the low frequency range has been increased an entire octave.

Referring to Fig. 27, representing a speaker with a conventional corrugated rim suspension as used in Fig. 23, it is well known that such suspensions are quite stiff in nature and result in a diaphragm having a relatively high resonance frequency characteristic that introduces distortion and makes the acoustic output appear to be louder as a result of this characteristic. However, in such cases, the ultimate output of sound energy is not as great.

Referring to Fig. 28, curve E represents a sinusoidal input to the speaker of Fig. 27 for some frequency below the resonance, whereas curve F represents the acoustic output from such a speaker. It will be noted that the output waves are flat-top, a distortion resulting from the diaphragm operating below its resonance frequency. Curve F, in other words, represents the output of waves below the resonant frequency of the diaphragm, caused by the fact that the motion of the cone is limited by the stiffness of the suspension.

In the arrangement of Fig. 25, a speaker having a diaphragm and flexible suspension as shown in Fig. 1 was used. The response frequency of this combination is shown in Fig. 29, curve A, as compared with the response characteristic using a conventional speaker, Figs. 23 and 27, shown in curve B. It will be seen that the peak at 150 cycles on curve B has been eliminated, and the low frequency range has been extended an entire octave (curve A).

As a result of the present invention, it is apparent that an acoustical system has been provided which extends the low frequency range of table model radio receivers and small console receivers as much as one octave. The arrangement is also useful in automobile speakers where the space is quite limited and where it is necessary to make the speaker housings quite small. The quality of music reproduction has been substantially improved, as well as intelligibility of speech, cabinet resonance having been eliminated. The non-linear distortion has been reduced to one-tenth in certain portions of the range, and the arrangement is highly simplified and low in cost for production.

Various modifications of the above structure embodying the invention may be made by those skilled in the art without departing from the spirit of the invention. For example, the novel suspension may be applied to other types of direct radiating diaphragms such as oval, disked, curved and so-called morning-glory shape. These may all be classified under the term "piston" type, that is, the type wherein the diaphragm has its central or main portion stiffened so that it moves as a whole at low audio frequencies. The invention has been illustrated in connection with the usual frusto-conical type of diaphragm, disclosed and claimed in Kellogg Patent 1,707,617. In regard to the combination of the novel speaker of Fig. 1 with an enclosed cabinet in Fig. 25, we are aware that enclosing the rear of a diaphragm in direct acting loudspeakers is not broadly new, having been disclosed, for example, by Frederick 1,955,800 (Fig. 3) and Rice 1,631,646 (Fig. 9) for the purpose of getting rid of the interfering back wave. Throughout the years in the development of loud speakers, it has generally been recognized, however, by those skilled in the art that rear enclosures introduced distortion, even though various expedients were used, and the arrangement was considered something to be avoided.

We claim as our invention:

1. In a sound-reproducing device, a direct acting, piston type diaphragm, a rigid housing having a supporting flange adjacent and parallel to the outer periphery of said diaphragm, and a compliant suspension system for said diaphragm comprising at least two compliant, circumferentially corrugated ring members, said members being arranged in spaced, parallel planes and connected in additive series relation for substantially decreasing resistance to axial driving forces applied to said diaphragm without substantially decreasing lateral stiffness of said suspension system, said members connecting said diaphragm to said supporting flange externally of said diaphragm.

2. In a sound-reproducing device, a housing, a direct acting diaphragm, and a flexible suspension system connecting said diaphragm to said housing, said system being constituted by a plurality of compliant, circumferentially corrugated sections of fibrous material located in superposed relation in different planes substantially normal to the axis of movement of said diaphragm, said sections being coupled in additive series relation between said diaphragm and said housing adjacent to the outer periphery of said diaphragm and external to said diaphragm for substantially decreasing resistance to axial driving forces without substantially decreasing lateral stiffness of said suspension system, said sections being equivalent to a flexible support of larger radial extent than either one of said sections alone relative to the axis of said diaphragm while occupying substantially less space radially than would said last mentioned support.

3. In a sound-reproducing device, an acoustic diaphragm, driving means therefor, a suspension system therefor comprising a housing surrounding said diaphragm, a compliant circumferentially corrugated peripheral member portion extending radially outward from said diaphragm, a compliant circumferentially corrugated ring member annularly secured at its outer margin to the periphery of said peripheral member and extending radially inward in overlapping spaced relation to said peripheral member, and structure including a flange portion of the diaphragm housing fixedly supporting said ring member at its inner margin adjacent to and spaced from said peripheral member portion of the diaphragm.

4. The invention as set forth in claim 3, wherein said ring member is positioned rearwardly of said peripheral member.

5. The invention as set forth in claim 3, wherein said ring member is positioned forwardly of said peripheral member.

6. The invention as set forth in claim 3, wherein said supporting structure is flexible for the force exerted by said driving means, and functions effectively as a third compliant member in series with said peripheral and ring members.

7. The invention as set forth in claim 3, wherein said peripheral member and said ring member are disposed in adjacent spaced planes, one of said members having an integrally formed edge extending out of its plane into contact with the corresponding edge of the other member for coupling them in series spaced relation.

8. The invention as set forth in claim 3, wherein said device is mounted in an opening in a wall of a substantially closed cabinet for confining the atmosphere around the rear surface of said diaphragm, the natural resonance of said device in unconfined air being substantially below the natural resonance of said device in said cabinet.

9. In a sound reproducing device, the combination of a substantially closed and relatively small cabinet having an opening in one wall thereof, a dynamic loudspeaker having a support connecting said loudspeaker to said cabinet, said loudspeaker having a vibratory system which has a natural resonance in unconfined air below the useful range of frequencies to be reproduced, said vibratory system including (1) a direct acting diaphragm mounted on said support and disposed behind said opening, said diaphragm having such small mass reactance that said loudspeaker efficiently reproduces relatively high audio frequencies, (2) a driving coil for said diaphragm, and (3) a suspension system for said diaphragm comprising a plurality of compliant, circumferentially corrugated members connecting said diaphragm to said support, said members being arranged in spaced, series, overlapping, parallel relationship for substantially decreasing resistance to axial driving forces without substantially decreasing lateral stiffness of said suspension system, the compliance of said suspension system being so large that the stiffness added thereto by the confined air back of said diaphragm raises the resultant resonance to a point that is still desirably low in the useful range of frequencies to be reproduced.

10. In an acoustic device, the combination of a substantially closed and relatively small cabinet having an opening in one wall thereof, a dynamic loudspeaker having a vibratory system which has a natural resonance in unconfined air below the useful range of frequencies to be reproduced, said vibratory system including (1) a direct acting diaphragm mounted in said cabinet behind said opening, (2) a housing for said diaphragm, and (3) a diaphragm suspension system comprising a plurality of compliant, circumferentially corrugated members connecting said diaphragm to said housing, said members being arranged in spaced, series, overlapping, parallel relationship for substantially decreasing resistance to axial driving force without substantially decreasing lateral stiffness of said suspension system, the compliance of said suspension system axially being so large that the stiffness added thereto by the confined air back of said diaphragm raises the resultant resonance to a point that is still desirably low in said useful range.

11. A sound reproducing device according to claim 10, characterized in that said corrugated members are connected to said housing adjacent to the outer periphery of said diaphragm and external to said diaphragm.

HARRY F. OLSON.
JOHN PRESTON.

REFERENCES CITED

The following references are of record in the file of this patent:

UNITED STATES PATENTS

| Number | Name | Date |
|---|---|---|
| 1,639,924 | Brown | Aug. 23, 1927 |
| 1,722,020 | Smythe | July 23, 1929 |
| 1,876,831 | Ballantine | Sept. 13, 1932 |
| 1,913,645 | Stenger | June 13, 1933 |
| 2,069,242 | Graham | Feb. 2, 1937 |
| 2,329,560 | Seabert | Sept. 14, 1943 |
| 2,439,666 | Marquis | Apr. 13, 1948 |